June 5, 1962     J. L. SULLIVAN     3,037,392
MOTION CONVERTING MECHANISM
Filed Aug. 1, 1960
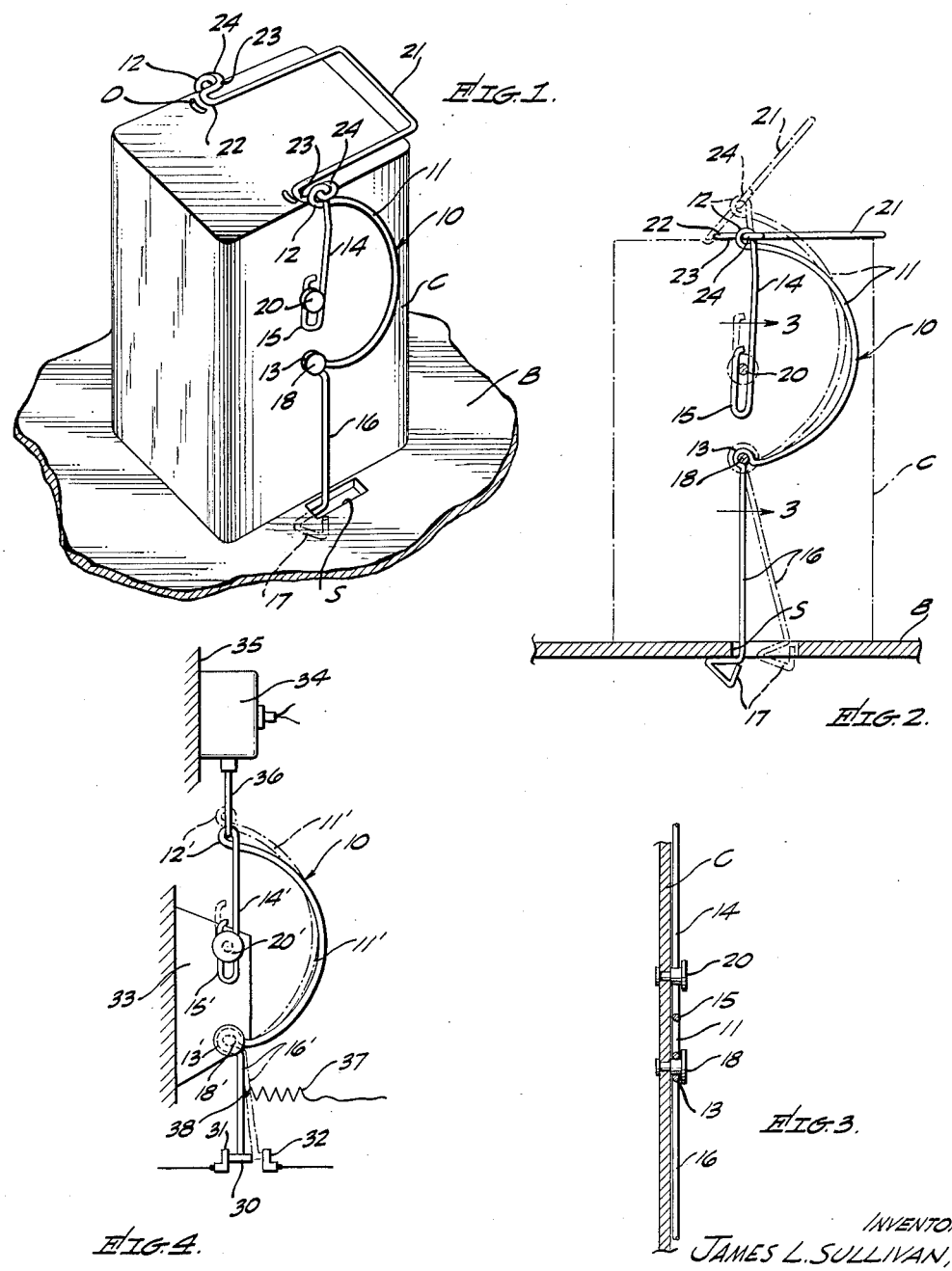
INVENTOR.
JAMES L. SULLIVAN,
BY
AGENT

United States Patent Office

3,037,392
Patented June 5, 1962

3,037,392
MOTION CONVERTING MECHANISM
James L. Sullivan, Manhattan Beach, Calif., assignor to Hughes Aircraft Company, Culver City, Calif., a corporation of Delaware
Filed Aug. 1, 1960, Ser. No. 46,840
6 Claims. (Cl. 74—96)

The present invention relates generally to a motion converting mechanism and relates more particularly to a simplified structure for use in converting linear to lateral or arcuate motion. The device of the present application finds particular utility in connection with resultant motions of a small incremental movement variety as may be encountered in latches, movements of electrical contacts, locking structures and/or shifting mechanisms.

In mechanical motion devices utilized to convert linear motion to lateral or arcuate movement, it has been the practice to employ crank mechanisms, levers, links, cams and the like. In many instances, where heavy structural mechanism must be employed, such prior structures are satisfactory for the purpose intended. In other instances, where heavy structural components are not required, it has been the practice to employ cam-type locking devices, screws, clamps or other screw mechanisms. This is particularly true in the latching and fastening arts. In switching structures, bell crank mechanisms have been used.

In such prior structures, the mechanisms employed for latching or locking, or for converting linear motion to lateral movement, have been relatively heavy and required a large volume or area for disposition thereof. These structures have also been relatively difficult in assembly or subassembly, with the size, complexity, weight and assembly necessities creating items of substantial cost.

It is therefore one important object of the present invention to provide a simple and efficient mechanism for converting linear motion to lateral or arcuate motion.

It is another important object of the invention to provide a simplified latch mechanism employing an integral element, linear movement of a portion of which provides lateral or arcuate movement of another portion thereof.

Another object of the invention is to provide a simplified latching mechanism.

A further object of the invention is to provide a latching mechanism having an integral component carried by an item to be latched to another item.

Still another object of the invention is to provide a simplified apparatus for providing a controlled lateral movement of an element through use of an integral wire or rod structure and upon application of linear force to a portion of the integral structure.

Other and further important objects of the invention will become apparent from the disclosures in the following detailed specification, appended claims and accompanying drawing, wherein:

FIGURE 1 is a perspective view of the present mechanism, shown in an application as a latching structure;

FIG. 2 is a side elevational view of the latching structure represented in FIG. 1 with the elements being shown in different positions;

FIG. 3 is an enlarged fragmentary sectional view through the support structure for the present mechanism, as taken substantially as indicated by line 3—3, FIG. 2; and FIG. 4 is a side elevational view showing the present mechanism employed in connection with the operation of electrical contacts.

With reference to the drawing, the present motion converting mechanism is indicated generally at 10. In FIGS. 1, 2 and 3, the mechanism is shown in association with a container C which may house such equipment as electrical components. The container C is shown as being removably attached to a base B. The representations in FIGS. 1, 2 and 3, as well as the alternate representation of the present mechanism in FIG. 4, are by way of example only and serve to illustrate practical applications of the mechanism in converting linear motion to lateral or arcuate movement. It will be understood that the present mechanism may be applied to a great variety of structures and for many different purposes without departing from the spirit and scope hereof.

As shown, the mechanism 10 may be employed in pairs and disposed on opposite sides of the container C. The mechanism 10 is constructed from a continuous length of wire or rod material of a resilient nature, with the various portions being thereby integrally interdisposed.

As shown in the drawing, the mechanism 10 includes a semicircular arcuate portion 11, one end thereof being terminated in an integral loop 12, another end thereof being terminated in an integral circular pivot portion 13. A rod portion 14 is integrally depended from the loop 12 and terminates in an integral hook portion 15. The hook portion 15 is elongated in the direction of the rod portion 14, the side structure thereof being substantially parallel to the rod portion 14. The circular pivot portion 13 has an integral lever portion 16 depended therefrom. The lever portion 16 is in substantial coextensive alignment with the rod portion 14 and terminates, in the present instance, in a generally triangular, integral latch portion 17. It may be seen that the entire integral structure of the mechanism 10 lies in substantially a common plane with the center of the loop portion 12, longitudinal center of the hook portion 15 and the center of the circular pivot portion 13 being in coextensive alignment, with the arcuate portion 11 being disposed laterally with respect to the referenced centers.

As shown in the illustrations of the drawing, the circular pivot portion 13 is pivotally retained in a fixed position by means of a stepped pin 18 or the like that may be secured, as in the present instance, to a wall of the container C. Additionally, the elongated hook portion 15 is longitudinally movably retained about a stepped pin 20 which may also be secured to the wall of the container C. It is further to be noted that when the present mechanism is employed as a latching structure, the latch portion 17 is adapted for disposition through and cooperation with one end of a slot S in the base B.

It may thus be seen that longitudinal movement of the end of the arcuate member 11 at the loop 12 will serve to change the radius of the arcuate member 11 and effectively increase this radius to move the lever portion 16 in the plane of the entire mechanism 10 and pivotally about the retaining pin 18. This motion is indicated in FIG. 2 by the solid and dotted line representations. The rod portion 14, hook portion 15 and pin 20 serve as a guide means and to maintain the linear motion substantially along the line extending between the loop 12, hook portion 15 and center of the circular pivot portion 13. The elongated loop portion 15 further serves to limit the extension in the area of the loop portion 12 and the increased radius deformation of the arcuate portion 11. In the form of the invention shown in FIGS. 1 and 2, the longitudinal or linear movement of the loop portion 12 and deformation of the arcuate portion 11 serves to move the latch portion 17 into and out of engagement with one end of the slot S, thus to retain the container C in contact with the base B. The resiliency of the arcuate portion 11 serves to return the arm portion 16 to its original position when the loop portion 12 is permitted to return to its original position.

Various mechanisms may be employed for linear or longitudinal movement of the loop 12 and deformation of the arcuate portion 11. In FIGS. 1 and 2, one means for accomplishing such linear movement is illustrated and comprises a toggle arrangement having a bale 21, curved portions 22 and link portions 23 integral with the bale. The ends of the link portions 23 are each provided with a loop 24 that is secured to the loop 12 of a pair of the mechanisms 10 positioned on and attached to opposite sides of the container C. The links 23 and side portions of the bale 21 are U-shaped and connected by the curved portions 22. The portions 22 are adapted for engagement with detents D in the upper end wall of the container C. When the bale 21 is moved from the solid line position in FIG. 2 to the dotted line position, the looped portion 12 of the mechanism 10 will be moved in substantially a linear direction, whereby laterally to move the arm portion 16 as indicated.

With reference to the form of the invention as shown in FIG. 4 wherein like portions and components are represented by like single primed reference numerals, it may be seen that the present mechanism may be employed as a means for actuating a contact member as indicated at 30 and carried by a free end of the arm portion 16'. The contact 30 is adapted for operation between fixed contacts 31 and 32. In this particular form of the invention, the pins 18' and 20' are carried by a fixed structure 33. Also, an electrical solenoid mechanism 34 secured to a fixed structure 35 serves as a means for moving the looped portion 12', through an interconnecting rod 36. In order to complete an electrical circuit, a coiled wire 37 may be connected as at 38 to the arm portion 16' of the mechanism 10' the other end thereof extending to a circuit being controlled. In the form of the invention shown in FIG. 4, it may thus be seen that operation of the solenoid 34, to retract the rod 36 toward the solenoid, will serve to move the contact 30 out of engagement with the contact 31 and into engagement with the contact 32. De-energization of the solenoid 34 serves to permit return of the contact 30 to the contact 31 by action of the resilient arcuate portion 11'.

It may thus be seen that linear motion is herein converted to lateral or arcuate motion through use of a simplified mechanism comprising a single element formed in a particular manner and retained by means of the pins 18 and 20. The mechanism 10 is thus very inexpensive and simple to manufacture and install and may merely be slid over or snapped onto the pins 18 and 20. Accordingly, the assembly of the present mechanism is also simple, with the operation of the mechanism being efficient and reliable in use. It is further to be noted that longitudinal or lateral force on the latch member 17 in a direction coextensive with the arm portion 16 will have no effect upon the mechanism. It is to be understood that the various portions of the present mechanism may be proportionally changed for particular applications thereof, with the radius of the arcuate portion 11, together with the resiliency thereof, being determined by installational situations and the requirement thereof.

Having thus described the invention and the present embodiments thereof, it is further desired to emphasize the fact that many further modifications may be resorted to in a manner limited only by a just interpretation of the following claims.

I claim:

1. In a mechanism for converting linear motion to lateral motion: an integral resilient member including an arcuate portion having one end thereof pivotally fixed; an arm portion integrally depended from said pivotally fixed end of said arcuate portion and having a free end; integral guide portion means depended from the other end of said arcuate portion and guided with respect to a fixed location; and means for moving said other end of said arcuate portion in a linear direction to increase a radius of said arcuate portion, whereby to cause pivotal movement of said arm portion from said pivotally fixed end of said arcuate portion and lateral movement of said free end of said arm portion.

2. In a mechanism for converting linear motion to lateral motion: an integral resilient member including an arcute portion having one end thereof pivotally fixed; an arm portion integrally depended from said pivotally fixed end of said arcuate portion and having a free end; integral guide portion means depended from the other end of said arcuate portion and guided with respect to a fixed location, said arcuate portion, arm and guide portions of said member being disposed in a common plane; and means for moving said other end of said arcuate portion in a linear direction to increase a radius of said arcuate portion, whereby to cause pivotal movement of said arm portion from said pivotally fixed end of said arcuate portion and lateral movement of said free end of said arm portion.

3. In a mechanism for converting linear motion to lateral motion: an integral resilient member including an arcuate portion having one end thereof pivotally fixed; an arm portion integrally depended from said pivotally fixed end of said arcuate portion and having a free end; integral guide portion means depended from the other end of said arcuate portion and guided with respect to a fixed location, said ends of said arcuate portion and said fixed location of said guide portion being in coextensive alignment; and means for moving said other end of said arcuate portion in a linear direction to increase a radius of said arcuate portion, whereby to cause pivotal movement of said arm portion from said pivotally fixed end of said arcuate portion and lateral movement of said free end of said arm portion.

4. In a mechanism for converting linear motion to lateral motion: an integral resilient member including an arcuate portion having one end thereof pivotally fixed; an arm portion integrally depended from said pivotally fixed end of said arcuate portion and having a free end; integral guide portion means depended from the other end of said arcuate portion and guided with respect to a fixed location, said arcuate portion, arm and guide portions of said member being disposed in a common plane, said ends of said arcuate portion and said fixed location of said guide portion being in coextensive alignment; and means for moving said other end of said arcuate portion in a linear direction to increase a radius of said arcuate portion, whereby to cause pivotal movement of said arm portion from said pivotally fixed end of said arcuate portion and lateral movement of said free end of said arm portion.

5. In a mechanism for converting motion in one direction to motion in a different direction: an integral resilient member including a curved portion having one end thereof pivotally fixed; an arm portion integrally depended from said pivotally fixed end of said curved portion and having a free end; integral guide portion means depended from the other end of said arcuate portion and guided with respect to a fixed location; lever means connected with said other end of said curved portion and engageable with a fixed member for moving said other end of said curved portion in a direction to increase the distance between said one end and said other end of said curved portion, whereby to cause pivotal movement of said arm portion from said one end of said curved portion and movement of said free end of said arm portion; and latch means carried by said free end of said arm portion.

6. In a mechanism for converting motion in one direction to motion in a different direction: an integral resilient member including an arcuate portion having one end thereof pivotally fixed; an arm portion integrally depended from said pivotally fixed end of said arcuate portion and having a free end; integral guide portion means depended from the other end of said arcuate portion and guided with respect to a fixed location, said arcuate portion, arm and guide portions of said member being disposed in a common plane, said ends of said arcuate portion and said fixed location of said guide portion being substantially in coextensive alignment; lever means connected with said other end of said arcuate portion and engageable with a fixed member for moving said other end of said arcuate portion in a linear direction to increase a radius of said arcuate portion, whereby to cause pivotal movement of said arm portion from said pivotally fixed end of said arcuate portion and lateral movement of said free end of said arm portion; and latch means carried by said free end of said arm portion.

References Cited in the file of this patent

UNITED STATES PATENTS

| | | |
|---|---|---|
| 241,089 | Sweeney | May 3, 1881 |
| 599,226 | Donahue | Feb. 15, 1898 |
| 823,437 | Peterson | June 12, 1906 |

FOREIGN PATENTS

| | | |
|---|---|---|
| 184,471 | Austria | Jan. 25, 1956 |